(12) United States Patent
Chakra et al.

(10) Patent No.: US 9,582,571 B2
(45) Date of Patent: *Feb. 28, 2017

(54) TARGETED MESSAGE RESPONSE (71) Applicant: International Business Machines Corporation, Armonk, NY (US)

(72) Inventors: Al Chakra, Apex, NC (US); Liam Harpur, Dublin (IE); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/004,065

(22) Filed: Jan. 22, 2016

(65) Prior Publication Data
US 2016/0140219 A1 May 19, 2016

Related U.S. Application Data (63) Continuation of application No. 13/945,170, filed on Jul. 18, 2013, now Pat. No. 9,282,066.

(51) Int. Cl.
*H04L 12/58* (2006.01)
*G06F 17/30* (2006.01)

(52) U.S. Cl.
CPC ........ *G06F 17/30687* (2013.01); *H04L 51/00* (2013.01); *H04L 51/063* (2013.01); *H04L 51/32* (2013.01); *H04L 51/12* (2013.01)

(58) Field of Classification Search
CPC ......... G06F 17/30395; G06F 17/30528; G06F 17/30539; G06F 17/30595; G06F 17/3064; G06F 17/30867; G06F 17/30946; G06F 17/3097; H04L 12/58; H04L 51/12; H04L 51/22; H04L 51/28; H04L 51/32; G06Q 10/107
See application file for complete search history.

(56) References Cited

U.S. PATENT DOCUMENTS

| 5,274,749 | A | 12/1993 | Evans |
| 5,835,087 | A | 11/1998 | Herz et al. |
| 6,324,569 | B1* | 11/2001 | Ogilvie ................ G06Q 10/107 709/206 |

(Continued)

FOREIGN PATENT DOCUMENTS

WO  0165336 A2  9/2001

OTHER PUBLICATIONS

Chaipah, Kornchawal N., "PURRS: A Personal Email Organization System using User Response Behaviors and Social Networks", Carnegie Mellon University, Pittsburgh, PA, Sep. 2011.

(Continued)

*Primary Examiner* — Backhean Tiv
(74) *Attorney, Agent, or Firm* — Maeve Carpenter (57) ABSTRACT

A tool for targeting a message response. The tool monitors reactions of a user to message subject lines, message content, and social networks. The tool analyzes user interest data and calculates a user interest rating per keyword. Rated keywords are stored in association with the user. When a user drafts a message addressed to a recipient, the tool compares rated keywords within the recipient's log with the subject line and message content. The tool suggests an alternative subject line likely to elicit a faster and more detailed response from the recipient.

20 Claims, 4 Drawing Sheets

(56) References Cited

U.S. PATENT DOCUMENTS

| | | | |
|---|---|---|---|
| 6,460,074 B1 | 10/2002 | Fishkin | |
| 6,701,347 B1* | 3/2004 | Ogilvie | G06Q 10/107 709/202 |
| 6,757,713 B1* | 6/2004 | Ogilvie | G06Q 10/107 709/202 |
| 6,816,885 B1* | 11/2004 | Raghunandan | G06Q 10/107 709/206 |
| 7,444,380 B1 | 10/2008 | Diamond | |
| 7,761,524 B2 | 7/2010 | Carmel et al. | |
| 8,301,705 B2* | 10/2012 | Wagner | G06Q 10/107 709/206 |
| 8,539,359 B2* | 9/2013 | Rapaport | G06Q 10/10 709/217 |
| 9,032,031 B2* | 5/2015 | Suzuki | G06Q 10/107 709/206 |
| 9,282,066 B2* | 3/2016 | Chakra | H04L 51/00 |
| 9,319,367 B2* | 4/2016 | Zeng | H04L 51/22 |
| 2003/0089218 A1* | 5/2003 | Gang | G06F 17/30743 84/615 |
| 2004/0111478 A1 | 6/2004 | Gross et al. | |
| 2005/0165739 A1 | 7/2005 | Yamamoto et al. | |
| 2006/0195461 A1 | 8/2006 | Lo et al. | |
| 2006/0277210 A1 | 12/2006 | Starbuck | |
| 2007/0005564 A1 | 1/2007 | Zehner | |
| 2007/0198549 A1* | 8/2007 | Hamdy | G06F 17/30595 |
| 2007/0250576 A1 | 10/2007 | Kumar et al. | |
| 2008/0278740 A1* | 11/2008 | Bird | G06Q 10/10 358/1.15 |
| 2008/0313283 A1 | 12/2008 | Cohen et al. | |
| 2009/0055481 A1* | 2/2009 | Carmel | G06Q 10/107 709/206 |
| 2009/0089654 A1 | 4/2009 | Wittig et al. | |
| 2009/0125462 A1 | 5/2009 | Krishnaswamy et al. | |
| 2009/0222296 A1* | 9/2009 | Wagner | G06Q 30/02 709/206 |
| 2009/0254624 A1* | 10/2009 | Baudin | G06Q 10/107 709/206 |
| 2010/0100370 A1* | 4/2010 | Khouri | H04L 12/58 704/9 |
| 2010/0131523 A1* | 5/2010 | Yu | G06Q 10/107 707/756 |
| 2011/0055196 A1* | 3/2011 | Sundelin | G06F 17/30528 707/711 |
| 2011/0119258 A1* | 5/2011 | Forutanpour | G06Q 10/107 707/723 |
| 2011/0154221 A1* | 6/2011 | DeLuca | G06Q 10/107 715/752 |
| 2012/0054284 A1* | 3/2012 | Rakshit | H04L 51/22 709/206 |
| 2012/0185498 A1* | 7/2012 | Loofbourrow | G06F 17/30395 707/767 |
| 2014/0289258 A1* | 9/2014 | Joshi | G06Q 10/107 707/741 |
| 2014/0359022 A1* | 12/2014 | Buddenbaum | H04L 51/32 709/206 |
| 2015/0026267 A1* | 1/2015 | Chakra | H04L 51/00 709/206 |
| 2016/0140219 A1* | 5/2016 | Chakra | H04L 51/00 707/734 |

OTHER PUBLICATIONS

Surendran, et al, "Automatic Discovery of Personal Topics to Organize Email", Proceedings of Second Conference on E-mail and Anti-spam, Microsoft Research, Stanford, CA, Jul. 2005.

U.S. Appl. No. 13/945,170, filed Jul. 18, 2013.

* cited by examiner

TARGETED MESSAGE RESPONSE

BACKGROUND OF THE INVENTION

The present invention relates generally to electronic communications, and more particularly to monitoring user interest to suggest an alternative subject line.

The Internet is a global network of computers and networks joined together by gateways that handle data transfer and the conversion of messages from a protocol of a sending network to a protocol used by a receiving network. On the Internet, computers may communicate with other computers. Information travels between computers over the Internet through a variety of languages, commonly referred to as protocols. A set of protocols used on the Internet is called the Transmission Control Protocol/Internet Protocol (TCP/IP). When a user sends a message or retrieves information from another computer, the TCP/IP protocols make the transmission possible. At their most basic level, these protocols establish the rules for how information passes through the Internet.

The Internet has revolutionized the way we communicate. Consisting of millions of private and public networks of local to global scope, the Internet has enabled and accelerated new forms of human interactions through electronic messaging, Internet forums, and social networking. As the most rapidly adopted form of communication to date, electronic messaging is utilized in both personal and business environments. One example of electronic messaging is electronic mail (e-mail). E-mail is an extremely popular communication tool that allows people around the world send billions of messages every day. Users are able to share experiences, cultivate knowledge, and stay connected with family and friends. In the business environment, e-mail may be used to develop ideas, foster work relationships, collaborate globally, and keep employees at all levels of business informed.

SUMMARY

In an embodiment of the present invention, a method, system, and computer program product are disclosed for capturing a user's reaction to subject lines and message content to achieve a targeted message response. A computer, in response to receiving an electronic message, determines a recipient and one or more keywords associated with the electronic message. The computer, in response to determining a recipient and one or more keywords, determines a level of user interest in the one or more keywords associated with the electronic message. The computer, in response to determining the level of user interest in the one or more keywords, calculates a user interest rating per keyword, and stores the rated keyword in association with the user.

The computer, in response to a user drafting a message addressed to the recipient, compares a rated keyword associated with the recipient to the subject line and message content. The computer, in response to retrieving pertinent rated keywords associated with the recipient, creates an alternative subject line for optimized recipient consumption. The computer, in response to creating the alternative subject line, presents the alternative subject line to the user, advising the user that replacing the current subject line with the alternative subject line is likely to produce a faster and more detailed message response from the recipient.

DETAILED DESCRIPTION

Embodiments of the present invention recognize that when accessing electronic mail, the sender and subject line are prominently displayed. With the abundance of electronic communications sent and received daily, and the limited amount of time a user may have to review these e-mails, it is difficult to give attention to every one. Often, important communications are disregarded, because the subject matter is not engaging. For example, in a business context, a user browsing their inbox may typically open messages with the most interesting subject matter first, or those messages that are sent by management. Thereafter, the user may begin their daily tasks and not return to their inbox to open messages for some time. If an initial impression of the message is not appealing to the user, the message may be overlooked. In this regard, otherwise important content in a message may be neglected due to inadequacies in the subject line. Therefore, senders are often challenged with crafting an enticing subject line to ensure recipient consumption.

Embodiments of the present invention provide the capability to monitor user reaction to e-mail subject lines, message content, and other social network data to learn what specific keywords generate the most interest for a user. Embodiments of the present invention also assist the sender in selecting an optimized subject line for improved recipient consumption.

Implementation of such embodiments may take a variety forms, and exemplary implementation details are discussed subsequently with reference to the Figures.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable media having computer-readable program code/instructions embodied thereon.

Any combination of computer-readable media may be utilized. Computer-readable media may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus or device.

Program code embodied on a computer-readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions that execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions that execute on the computer or other programmable apparatus provide processes for implementing the functions/acts specified in the flowchart and/or block diagram block or blocks.

Figure 1:
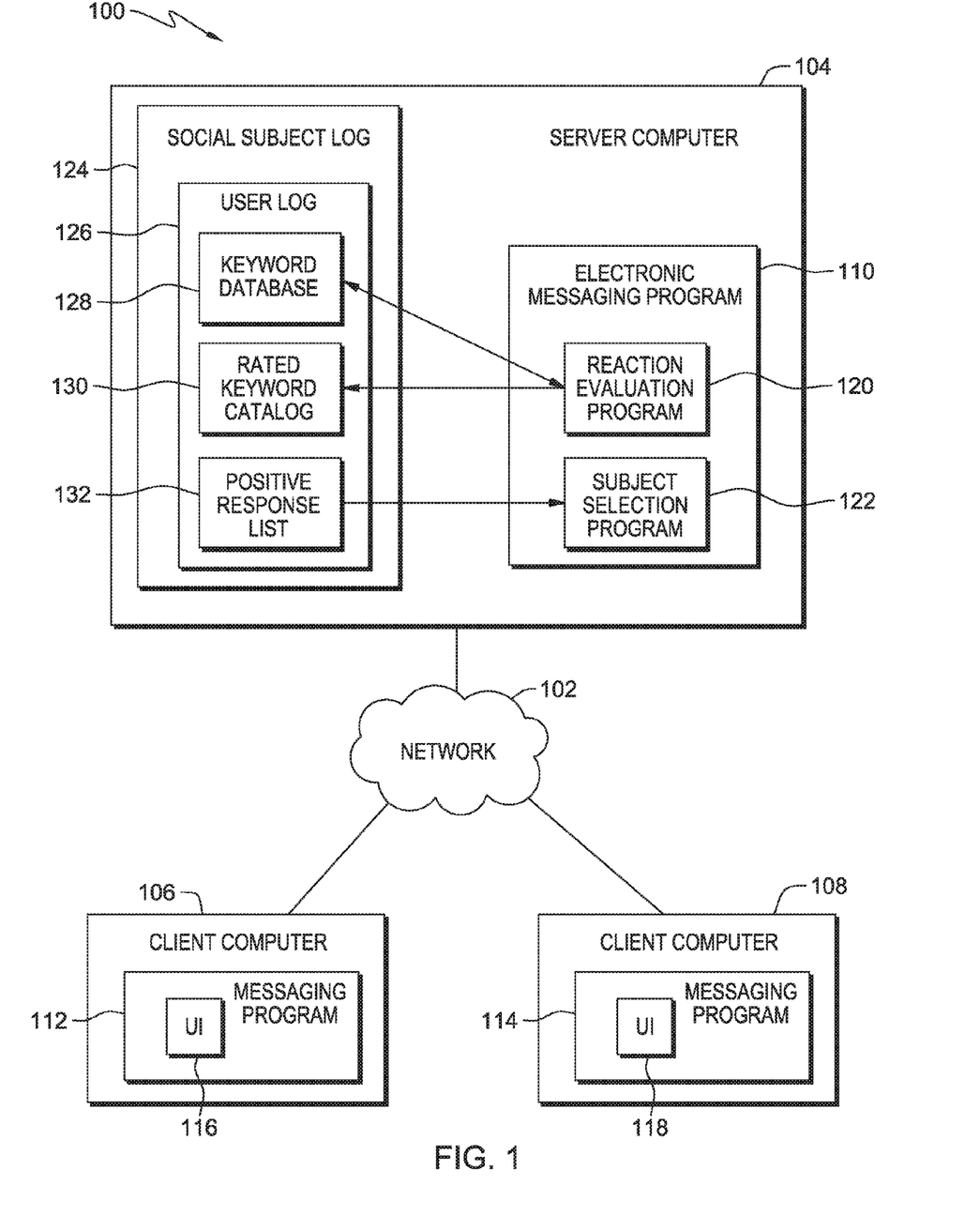
FIG. 1 is a block diagram of a distributed data processing environment according to an embodiment of the present invention.

The present invention will now be described in detail with reference to Figures. FIG. 1 illustrates a distributed data processing environment, generally designated 100, according to one embodiment of the present invention.

Distributed data processing environment 100 comprises network 102, server computer 104, and multiple client computers such as client computers 106 and 108. Network 102 may include wire cables, wireless communication links, fiber optic cables, routers, switches and/or firewalls. Server computer 104 and client computers 106 and 108 are interconnected by network 102.

Server computer 104 may be, for example, a server computer system such as a management server, web server, or any other electronic device or computing system capable of sending and receiving data. In another embodiment, server computer 104 represents a "cloud" of computers interconnected by one or more networks, where server computer 104 is a computing system utilizing clustered computers and components to act as a single pool of seamless resources when accessed through network 102. This is a common implementation for data centers in addition to cloud computing applications. Client computers 106 and 108 are clients to server computer 104, and may be, for example, a notebook, laptop computer, tablet computer, a handheld device or smart phone, a thin client, or any other electronic device or computing system capable of communicating with server computer 104 through network 102.

Server computer 104 executes server electronic messaging program 110 for receiving, sending, and managing electronic messages, such as e-mail, instant messages and text messages, between client computer 106 and client computer 108. Client messaging programs 112 and 114 execute on client computers 106 and 108, respectively. Client messaging programs 112 and 114 communicate securely with server electronic messaging program 110 and provide respective user interfaces 116 and 118 for composing and viewing electronic messages. Server computer 104 includes a social subject log 124 for storing multiple user logs, such as user log 126. User log 126 contains a keyword database 128, a rated keyword catalog 130 and a positive response list 132.

Server messaging program 110 may include a number of programs and functions to achieve a targeted message response for a recipient. In one embodiment, reaction evaluation program 120 learns what keywords generate the most interest for a user by monitoring user activity. For example, as a user browses their inbox or social network profiles (such as Facebook®, LinkedIn®, or communities) reaction evaluation program 120 compiles multiple data points (such as action taken on an e-mail, time spent on a message, or information from social profiles) within keyword database 128, that are then used to calculate a user interest rating for any given keyword. Reaction evaluation program 120 assigns ratings to the collected keywords and records them to a rated keyword catalog 130 within user log 126.

In one embodiment of the present invention, subject selection program 122 may utilize the data gathered and processed by reaction evaluation program 120 to suggest an alternative subject line for more optimized recipient consumption. For example, when a sender drafts an e-mail (including content and subject line) and adds a recipient, subject selection program 122 may call on social subject log 124 to access the relevant recipient user log 126. Subject selection program 122 may cross reference the current draft's content and subject line with a recipient's rated keyword catalog 130. Alternative high impact keywords from rated keyword catalog 130 may populate a positive response list 132. Subject selection program 122 creates an alternative subject line from keywords in positive response list 132 and presents the alternative subject line to the sender through, for example, user interface 116 on client computer 106. Subject selection program 122 may advise the sender that the alternative subject line is, for example, 30% more likely to illicit a faster and more detailed response from the recipient compared to using the current subject line.

In a trusted environment, user log 126 may be attached to user IDs. For example, if the user is an employee of a corporation, social subject log 124 contains all the employees' user IDs and their corresponding user log 126. Each employee has a personalized rated keyword catalog 130 that other employees may access using subject selection program 122. In the embodiment depicted in FIG. 1, social subject log 124 is stored on local storage of server computer 104. In an alternative embodiment, social subject log 124 may be stored within network 102.

In another embodiment of the present invention, reaction evaluation program 120 and subject selection program 122 are part of messaging programs 112 and 114 installed on client computers 106 and 108, respectively. In such an embodiment, social subject log 124 may be stored on network 102.

In the depicted example, network 102 is the Internet representing a worldwide collection of networks and gateways that use TCP/IP protocols to communicate with one another. Network 102 may also be implemented as a number of different types of networks, such as an intranet, a local area network (LAN), or a wide area network (WAN). FIG. 1 is intended as an example, and not as an architectural limitation for the different embodiments.

Distributed data processing environment 100 may include additional server computers, client computers, displays and other devices not shown.

Server computer 104 and client computers 106 and 108, each maintain respective internal components, and respective external components. In general, server computer 104 and client computers 106 and 108 can be any programmable electronic device as described in further detail with respect to FIG. 4.

Figure 2:
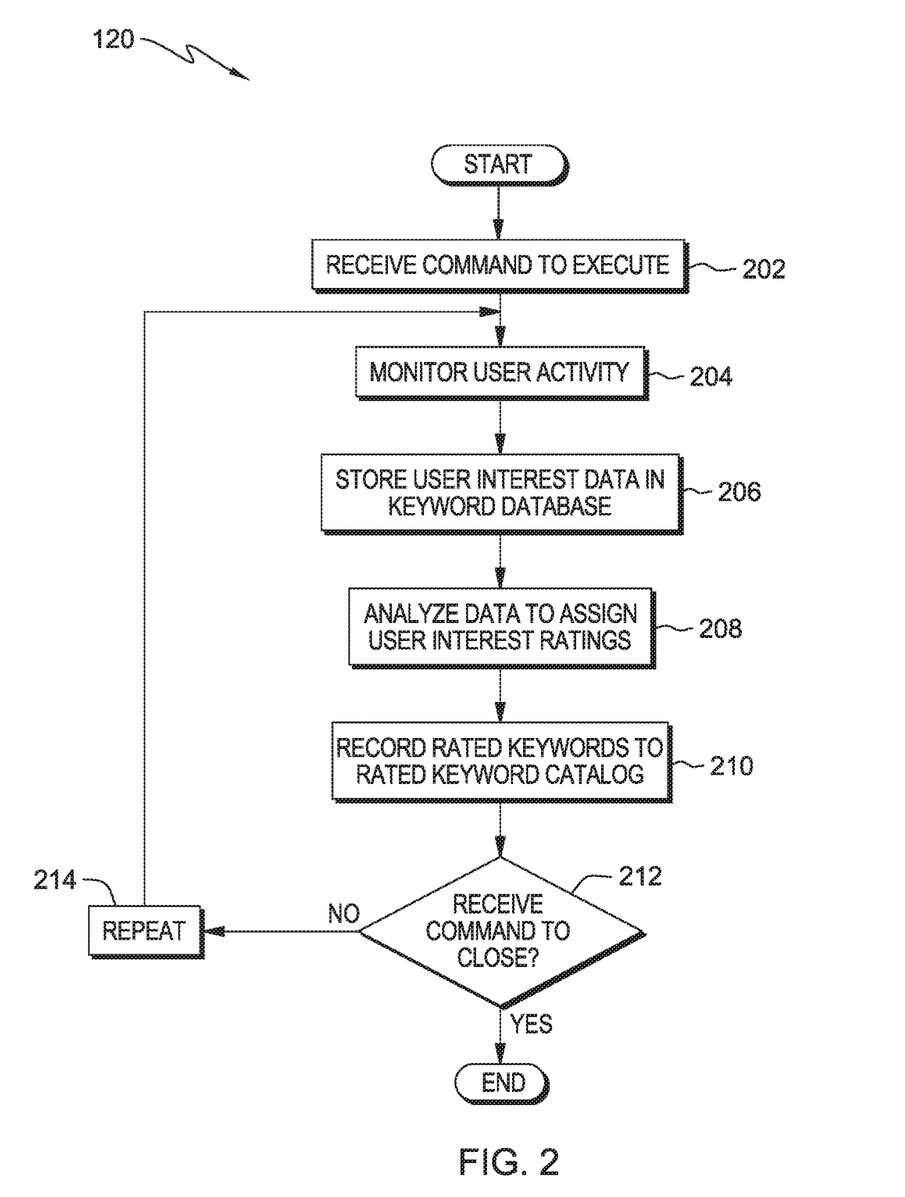
FIG. 2 is a flowchart of the steps of a program, residing on the server computer of FIG. 1, for monitoring user activity to determine what keywords generate the most interest for a user, in accordance with an embodiment of the present invention.

FIG. 2 is a flowchart of the steps of reaction evaluation program 120 for monitoring user activity to determine what keywords generate the most interest for a user, in accordance with one embodiment of the present invention.

In step 202, reaction evaluation program 120 receives a command to begin execution. In one embodiment of the present invention, the command to execute may be a default setting within server electronic messaging program 110. In another embodiment, the command to execute may be enabled by, for example, the user of client computer 106 through user interface 116 of messaging program 112.

In step 204, reaction evaluation program 120 monitors user activity. In one implementation, when a user opens their inbox, reaction evaluation program 120 may determine the recipient and one or more keywords associated with the electronic message. Reaction evaluation program 120 may determine the order that messages are opened, the rate that messages are opened, or the length of time spent on each message after opening, relative to prominent words or phrases (such as pronouns, nouns, verbs, etc.) present in the subject line or content of the message. Reaction evaluation program 120 may also track the type of action taken on the message (such as reply, forward, flag, archive, or delete). For example, a user opens their inbox every morning at 9:00 AM. The user first opens a message with the keyword "sales" in the subject line, within 1 minute after opening their inbox, and spends 3-4 minutes flagging and replying to the message. Reaction evaluation program 120 gathers this data related to the keyword "sales" (e.g., timing, actions taken, etc.), assigns it to the keyword "sales," and stores it as user interest data within keyword database 128 of user log 126 (step 206). In various embodiments, multiple keywords and phrases may be gathered from a subject line.

In another implementation, when a user browses social networks, reaction evaluation program 120 may observe unique elements (such as prominent words or phrases, activities, affiliations, or areas of expertise) that interest the user as evidenced by positive indicia (such as time spent on a particular social profile or forum, frequency of reoccurring words, phrases, topics, or activities, or similarity of various affiliations). In one embodiment, reaction evaluation program 120 utilizes a data mining process, such as association rule learning, to search for relationships between variables, or a web user analysis process, such as sequential pattern mining, to extract data items that frequently occur together in sequence. For example, a user may be a member of the group "Bob Loblaw Law Blog" on Facebook, may frequently access the legal website abovethelaw.com, and may post comments, many including the word "law," on the Corporate and Securities Law Community on Lexis-Nexus™. Reaction evaluation program 120 gathers this information related to the word "law," and stores it as user interest data within keyword database 128 of user log 126 (step 206). Reaction evaluation program 120 may also utilize an information extraction process, such as "wrappers," which are sets of highly accurate rules that extract a particular page's content, or machine-learning based natural language processing (NLP), to extract user interest data from a social network.

In one embodiment, reaction evaluation program 120 may begin monitoring user activity when server computer 104 receives a request to access a web page. In another embodiment, if reaction evaluation program 120 is installed on, for example, client computer 106, reaction evaluation program 120 may monitor user activity by searching website history on local storage. If reaction evaluation program 120 is installed on, for example server computer 104, reaction evaluation program 120 may monitor user activity by placing a web bug or cookie on, for example, client computer 106 that will download website history to storage on server computer 104.

In another implementation, reaction evaluation program 120 may be user configurable to allow a user to determine what types of activity reaction evaluation program 120 monitors. For example, a user may constrain reaction evaluation program 120 to monitor only positive indicators of interest (such as reply to a message, flag as important, etc.), only negative indicators of interest (such as delete message, never open message, long delay before accessing message, etc.), or a combination of both.

In step 208, reaction evaluation program 120 analyzes the user interest data stored in keyword database 128 to establish a user interest baseline and calculate a user interest rating for each keyword observed. In one implementation, reaction evaluation program 120 may cross-reference the user interest data for the keyword "sales" (stored in keyword database 128) with an indicator checklist tool. An indicator checklist tool may include a myriad of default parameters that, if satisfied, can increase or decrease the user interest rating for a given keyword. For example, an indicator checklist tool may include parameters such as "first message opened," "second message opened," and so on, "0-1 minute spent on message," "1-2 minutes spent on message," "2-3 minutes spent on message," and so on, or "reply to message," "flag message," "delete message," etc. Each parameter, if satisfied, may count (either positive value, such as 0.5, or a negative value, such as −0.5) towards the final user interest rating for the given keyword. Expanding on the example above, when reaction evaluation program 120 analyzes the keyword "sales" in the indicator checklist tool, the keyword "sales" may satisfy multiple parameters, contributing to a final user interest rating of, for example, 3.5. In another implementation, reaction evaluation program 120 may be user configurable to allow for personalization of parameters that are included in an indicator checklist tool.

In step 210, reaction evaluation program 120 stores rated keywords to rated keyword catalog 130. In one implementation, reaction evaluation program 120 may catalog rated keywords in rated keyword catalog 130 by their assigned user interest rating. For example, the keyword "sales," with a user interest rating of 3.5, would be cataloged between, for example, "success," with a user interest rating of 4.0, and "marketing," with a user interest rating of 3.0. These positions may not be static, as reaction evaluation program 120 may update user interest data on a constant basis, and over time, rated keyword catalog 130 evolves, becoming more accurate as data is collected. In another implementation, reaction evaluation program 120 may store rated keywords in rated keyword catalog 130 by relatedness of the keywords. For example, the keyword "sales" may be cataloged with related keywords, such as "marketing," "advertising," "promotion," or "deals," independent of assigned user interest ratings. In another implementation, reaction evaluation program 120 may be user configurable to allow for personalization in the way keywords are organized in rated keyword catalog 130.

If reaction evaluation program 120 receives a command to close (positive branch of step 212), reaction evaluation program 120 ceases to monitor, analyze, and store user interest data. If reaction evaluation program 120 does not receive a command to close (negative branch of step 212), reaction evaluation program 120 continues to monitor, analyze, and store user interest data.

In one embodiment, reaction evaluation program 120 may be an intelligent system, continuously learning what keywords generate the most interest for a user over time, by constantly monitoring the latest user activity and updating user interest data.

Figure 3:
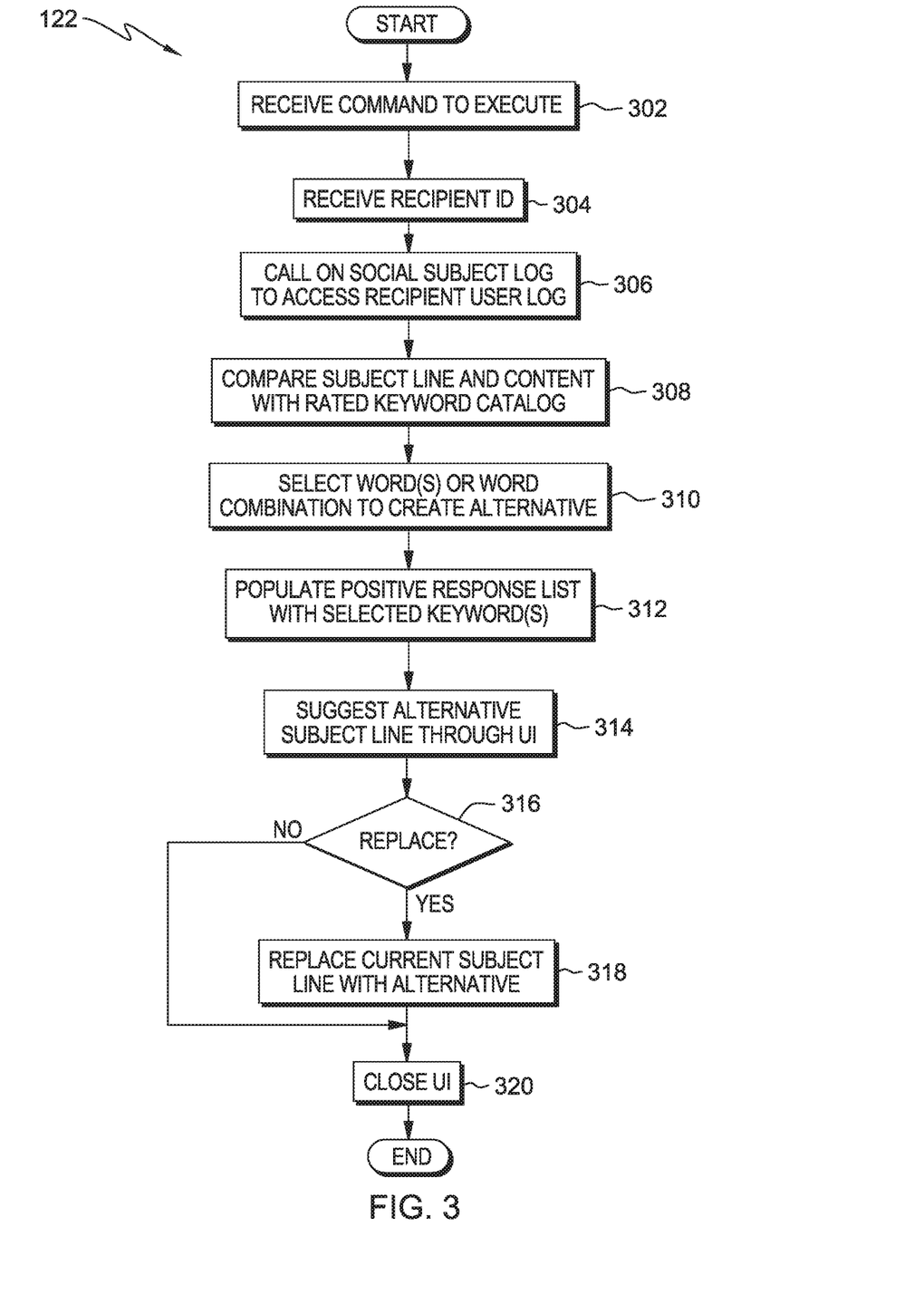
FIG. 3 is a flowchart of the steps of a program, residing on the server computer of FIG. 1, for providing a user with an alternative subject line for optimized recipient consumption, in accordance with an embodiment of the present invention.

FIG. 3 is a flowchart of the steps of subject selection program 122 for providing an alternative subject line for optimized recipient consumption, in accordance with an embodiment of the present invention.

In one embodiment, in step 306, subsequent to receiving a command to execute (step 302), and receiving notification that a user drafted a message and affixed a recipient ID in the address line (step 304), subject selection program 122 calls on social subject log 124 to search for a user log associated with the recipient ID affixed in the address line of the message. In one implementation, subject selection program 122 may utilize a lightweight directory access protocol (LDAP) for accessing and maintaining user log directory information within social subject log 124. For example, subject selection program 122 may request an LDAP search for a user log matching the recipient ID (such as, the recipient's email address, first and last name, handle, etc.). If a user log, such as user log 126, matches the recipient ID, LDAP retrieves the user log for subject selection program 122 to utilize it.

In step 308 subject selection program 122 compares the subject line and content of the message to stored rated keywords within rated keyword catalog 130 of recipient's user log. In one implementation, subject selection program 122 may utilize natural language processing (NLP) to compare the subject line to stored rated keywords within rated keyword catalog 130. For example, a user drafts a message with the subject line, "What is the status of the java project from 3 months ago?" Subject selection program 122 may, with the assistance of natural language support, compare prominent words or phrases from the subject line (e.g., status, java, project, 3 months ago) with stored rated keywords from rated keyword catalog 130 to generate candidate rated keywords (such as status, java, project, time, milestone, deadline, report, coding, testing, resources, etc.) that may be synonyms, substitute words, or identical words relative to the prominent words from the draft subject line.

In step 310, subject selection program 122 selects one or more words from the candidate rated keywords to incorporate into an alternative subject line. In one implementation, subject selection program 122 may use a predictive analytics system to determine the likelihood that a recipient will respond to a given alternative word or word combination. Subject selection program 122 may use the rating assigned to each stored rated keyword (an indication of user interest) to ascertain a relative percentage increase of recipient response by selecting the alternative. Subject selection program 122 may select from the candidate rated keywords a word or word combination representative of the highest user interest rating as an alternative subject line. For example, of the candidate rated keywords, "coding" has a user interest rating of 7.5, and "milestone" has a user interest rating of 8.5. Subject selection program 122 may ascertain that of the candidate rated keywords, the word combination "coding milestone," is semantically equivalent to the draft subject line and, if used as a standalone subject line, "coding milestone" represents an alternative with the greatest likelihood of recipient response. In another implementation, subject selection program 122 may be user configurable to allow for selection of the type of relationship between the candidate rated keywords and the draft subject line that the predictive analytics program uses in selecting words or word combinations for the alternative subject line. For example, subject selection program 122 may select candidate rated keywords that are most attractive to the recipient (based on highest weight user interest rating) that are most similar to the subject line (e.g., purchases being most similar to sales) or a combination of most attractive similar words. In another implementation, subject selection program 122 may be user configurable to allow for designating the number of alternative subject line suggestions provided to the user. For example, a user could configure subject selection program 122 to give only the best alternative, the top three alternatives, or all possible alternatives from the set of candidate keywords.

In step 312, subject selection program 122 populates positive response list 132 with the created alternative words or word combinations. Alternative words or word combinations on positive response list 132 may be presented to the user through, for example, user interface 116 on client computer 106 (step 314). Subject selection program 122 may advise the user that they are, for example, 30% more likely to receive a faster and more detailed response from the recipient using the suggested optimized alternative, and then prompt them to replace the draft subject line with the suggested optimized alternative (step 316). If a user elects to replace the current draft subject line with the suggested optimized alternative, then the alternative takes the place of the draft subject line, and the user interface closes. The user may then send the message to the recipient.

Figure 4:
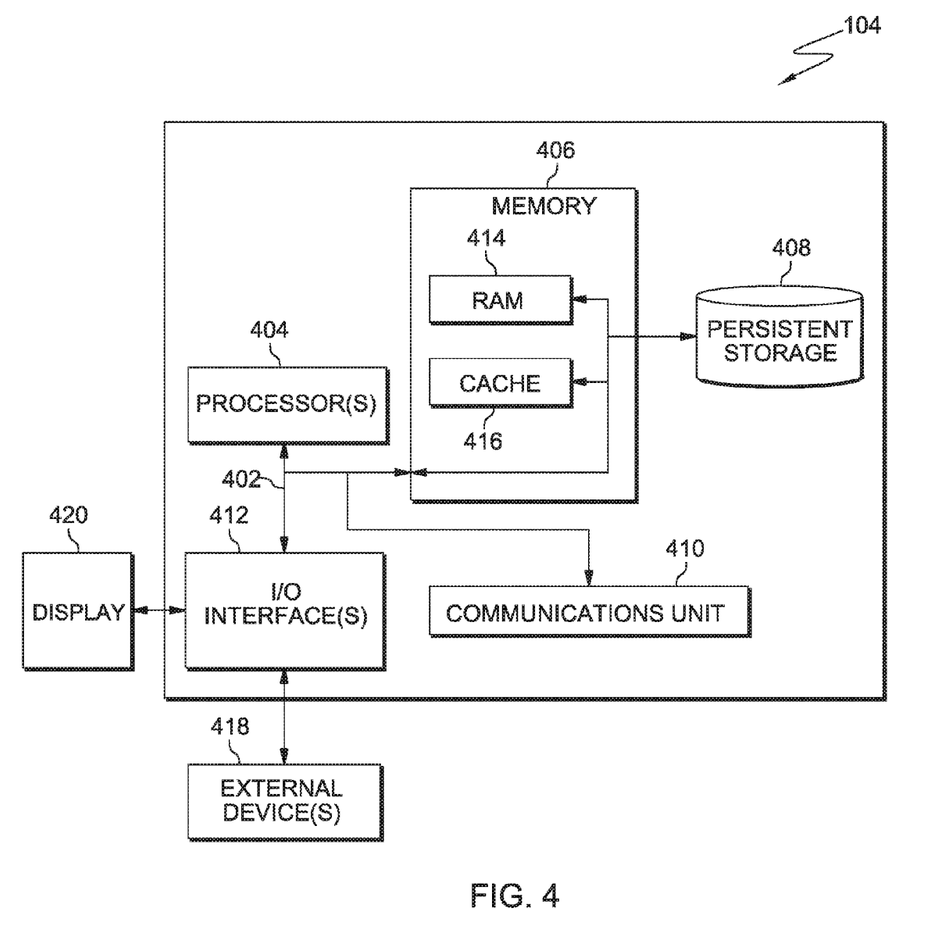
FIG. 4 depicts a block diagram of components of a data processing system (such as the server computer and client computers of FIG. 1), depicted in accordance with an illustrative embodiment.

FIG. 4 depicts a block diagram of components of server computer in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 104 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Reaction evaluation program 120 and subject selection program 122 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including client computers 106 and 108. In these examples, communications unit 410 includes one or more network interface cards. Communications unit 410 may provide communications through the use of either or both physical and wireless communications links. Reaction evaluation program 120 and subject selection program 122 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., reaction evaluation program 120 and subject selection program 122, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for targeting a message response, the method comprising:
   monitoring, by one or more computer processors, recipient activity related to one or more electronic messages received by a recipient;
   gathering, the by one or more computer processors, recipient interest data, wherein gathering includes collecting one or more keywords that interest the recipient as evidenced by one or more positive indicators of interest associated with the one or more keywords;
   storing, the by one or more computer processors, the one or more keywords within a database associated with the recipient;
   calculating, the by one or more computer processors, a recipient interest rating for each of the one or more keywords, wherein the recipient interest rating is based, at least in part, on the recipient activity and an established recipient interest baseline;

in response to a sender drafting a subsequent electronic message addressed to the recipient, comparing, by the one or more computer processors, the one or more keywords within a database associated with the recipient to a subject line and message content of the subsequent electronic message; and suggesting, by the one or more computer processors, one or more alternative subject lines incorporating at least one of the one or more keywords stored within the database associated with the recipient, wherein suggesting the one or more alternative subject lines includes utilizing a predictive analytics system to determine a relative percentage increase in likelihood that the recipient will respond based on the one or more alternative subject lines.

2. The method of claim 1, wherein monitoring recipient activity related to one or more electronic messages received by a recipient, comprises at least one of:

determining, by one or more computer processors, an order in which the one or more electronic messages are opened;

determining, by one or more computer processors, a length of time spent on each of the one or more electronic messages when opened;

determining, by the one or more computer processors, a type of action taken on each of the one or more electronic messages;

determining, by the one or more computer processors, a frequency of words used in the one or more electronic messages;

determining, by the one or more computer processors, one or more affiliations of the recipient;

determining, by the one or more computer processors, a type of words used in the one or more electronic messages; and determining, by the one or more computer processors, a format of words used in the one or more electronic messages.

3. The method of claim 1, wherein gathering recipient interest data, further comprises:

extracting, by the one or more computer processors, recipient interest data from one or more social networks.

4. The method of claim 1, wherein calculating the recipient interest rating for the one or more keywords, further comprises assigning, by the one or more computer processors, the one or more keywords a weight based on at least one of:

determining, by the one or more computer processors, one or more actions taken on the one or more electronic messages;

determining, by the one or more computer processors, a time spent on the one or more electronic messages by the recipient;

determining, by the one or more computer processors, how quickly the one or more electronic messages was accessed by the recipient; and determining, by the one or more computer processors, a relationship between the recipient and a sender.

5. The method of claim 4, wherein assigning the one or more keywords a weight based on determining one or more indicators, further comprises:

assigning, by the one or more computer processors, a positive point value for indicators suggesting high user interest, and a negative point value for indicators suggesting low user interest.

6. The method of claim 1, wherein comparing the one or more keywords within a database associated with the recipient to a subject line and message content of the subsequent electronic message, further comprises at least one of;

searching, by the one or more computer processors, for synonyms, of one or more words within the subject line and message content, within the stored rated keywords;

searching, by the one or more computer processors, for one or more stored rated keywords identical to one or more words within the subject line and message content;

searching, by the one or more computer processors, for rated keywords, based on weight, within the stored rated keywords; and searching, by the one or more computer processors, for one or more stored rated keywords equivalent to one or more words within the subject line and message content.

7. The method of claim 1, wherein suggesting one or more alternative subject lines, further comprises at least one of:

creating, by the one or more computer processors, an alternative subject line from one or more rated keywords with the highest weight;

creating, by the one or more computer processors, an alternative subject line from one or more rated keywords determined to be synonyms of one or more words within the subject line and message content of the subsequent electronic message;

creating, by the one or more computer processors, an alternative subject line from one or more rated keywords determined to be equivalent to one or more words within the subject line and message content of the subsequent electronic message; and creating, by the one or more computer processors, an alternative subject line from one or more combinations of rated keywords.

8. The method of claim 7, wherein creating an alternative subject line from one or more rated keywords, further comprises:

creating, by the one or more computer processors, a second alternative subject line, subsequent to creating the alternative subject line, which is proffered to the user to replace the subject line of the subsequent electronic message.

9. The method of claim 1, wherein suggesting one or more alternative subject lines, further comprises:

advising, by the one or more computer processors, the sender of the relative percentage increase in likelihood that the recipient will respond based on the one or more alternative subject lines.

10. A computer program product embodied on a computer-readable storage device for targeting a message response, the computer program product comprising:

one or more computer-readable storage devices and program instructions stored on the one or more computer-readable storage devices, the program instructions comprising:

program instructions to monitor recipient activity related to one or more electronic messages received by a recipient;

program instructions to gather recipient interest data, wherein gathering includes collecting one or more keywords that interest the recipient as evidenced by one or more positive indicators of interest associated with the one or more keywords;

program instructions to store the one or more keywords within a database associated with the recipient;

program instructions to calculate a recipient interest rating for each of the one or more keywords, wherein the recipient interest rating is based, at least in part, on the recipient activity and an established recipient interest baseline;

in response to a sender drafting a subsequent electronic message addressed to the recipient, program instructions to compare the one or more keywords within a database associated with the recipient to a subject line and message content of the subsequent electronic message; and program instructions to suggest one or more alternative subject lines incorporating at least one of the one or more keywords stored within the database associated with the recipient, wherein suggesting the one or more alternative subject lines includes utilizing a predictive analytics system to determine a relative percentage increase in likelihood that the recipient will respond based on the one or more alternative subject lines.

11. The computer program product of claim 10, wherein program instructions to monitor recipient activity related to one or more electronic messages received by a recipient, comprise at least one of:

program instructions to determine an order in which the one or more electronic messages are opened;

program instructions to determine a length of time spent on each of the one or more electronic messages when opened;

program instructions to determine a type of action taken on each of the one or more electronic messages;

program instructions to determine a frequency of words used in the one or more electronic messages;

program instructions to determine one or more affiliations of the recipient;

program instructions to determine a type of words used in the one or more electronic messages; and program instructions to determine a format of words used in the one or more electronic messages.

12. The computer program product of claim 10, wherein program instructions to gather recipient interest data, further comprise:

program instructions to extract recipient interest data from one or more social networks.

13. The computer program product of claim 10, wherein program instructions to calculate the recipient interest rating for the one or more keywords, further comprise:

program instructions to assign the one or more keywords a weight based on at least one of:

program instructions to determine one or more actions taken on the one or more electronic messages;

program instructions to determine a time spent on the one or more electronic messages by the recipient;

program instructions to determine how quickly the one or more electronic messages was accessed by the recipient; and program instructions to determine a relationship between the recipient and a sender.

14. The computer program product of claim 13, wherein program instructions to assign the one or more keywords a weight based on determining one or more indicators, further comprise:

program instructions to assign a positive point value for indicators suggesting high user interest, and a negative point value for indicators suggesting low user interest.

15. A computer system for targeting a message response, the computer system comprising:

one or more computer processors;

one or more computer-readable storage media;

program instructions stored on at least one of the one or more computer-readable storage media for execution by at least one of the one or more computer processors, the program instructions comprising:

program instructions to monitor recipient activity related to one or more electronic messages received by a recipient;

program instructions to gather recipient interest data, wherein gathering includes collecting one or more keywords that interest the recipient as evidenced by one or more positive indicators of interest associated with the one or more keywords;

program instructions to store the one or more keywords within a database associated with the recipient;

program instructions to calculate a recipient interest rating for each of the one or more keywords, wherein the recipient interest rating is based, at least in part, on the recipient activity and an established recipient interest baseline;

in response to a sender drafting a subsequent electronic message addressed to the recipient, program instructions to compare the one or more keywords within a database associated with the recipient to a subject line and message content of the subsequent electronic message; and program instructions to suggest one or more alternative subject lines incorporating at least one of the one or more keywords stored within the database associated with the recipient, wherein suggesting the one or more alternative subject lines includes utilizing a predictive analytics system to determine a relative percentage increase in likelihood that the recipient will respond based on the one or more alternative subject lines.

16. The computer system of claim 15, wherein program instructions to monitor recipient activity related to one or more electronic messages received by a recipient, comprise at least one of:

program instructions to determine an order in which the one or more electronic messages are opened;

program instructions to determine a length of time spent on each of the one or more electronic messages when opened;

program instructions to determine a type of action taken on each of the one or more electronic messages;

program instructions to determine a frequency of words used in the one or more electronic messages;

program instructions to determine one or more affiliations of the recipient;

program instructions to determine a type of words used in the one or more electronic messages; and program instructions to determine a format of words used in the one or more electronic messages.

17. The computer system of claim 15, wherein program instructions to gather recipient interest data, further comprise:

program instructions to extract recipient interest data from one or more social networks.

18. The computer system of claim 15, wherein program instructions to calculate the recipient interest rating for the one or more keywords, further comprise:

program instructions to assign the one or more keywords a weight based on at least one of:

program instructions to determine one or more actions taken on the one or more electronic messages;

program instructions to determine a time spent on the one or more electronic messages by the recipient;

program instructions to determine how quickly the one or more electronic messages was accessed by the recipient; and program instructions to determine a relationship between the recipient and a sender.

19. The computer system of claim 18, wherein program instructions to assign the one or more keywords a weight based on determining one or more indicators, further comprise:

program instructions to assign a positive point value for indicators suggesting high user interest, and a negative point value for indicators suggesting low user interest.

20. The computer system of claim 15, wherein program instructions to suggest one or more alternative subject lines, further comprise:

program instructions to advise the sender of the relative percentage increase in likelihood that the recipient will respond based on the one or more alternative subject lines.

\* \* \* \* \*